United States Patent
Keller et al.

(10) Patent No.: US 7,032,377 B1
(45) Date of Patent: Apr. 25, 2006

(54) NEUTRAL START SWITCH

(75) Inventors: Scott W. Keller, Charleston, IL (US); Thomas P. Gavin, Sullivan, IL (US); Donald G. Cook, Sullivan, IL (US); Michael E. Cook, Sullivan, IL (US); Lonnie E. Holder, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 212 days.

(21) Appl. No.: 10/653,319

(22) Filed: Sep. 2, 2003

(51) Int. Cl.
*F16D 31/02* (2006.01)
(52) U.S. Cl. .......................................... 60/399; 60/387
(58) Field of Classification Search ................ 60/399, 60/328, 387, 487; 92/12.2, 5 R
See application file for complete search history.

(56) References Cited

U.S. PATENT DOCUMENTS

| | | |
|---|---|---|
| 3,613,482 A | 10/1971 | Benson, Jr. et al. |
| 3,984,967 A | 10/1976 | Jones |
| 3,999,643 A | 12/1976 | Jones |
| 4,271,728 A | 6/1981 | Wakamatsu |
| 4,998,450 A | 3/1991 | Nogle |
| 5,123,244 A * | 6/1992 | Kita et al. ................ 60/328 |
| 5,314,038 A | 5/1994 | Peterson |
| 5,314,387 A | 5/1994 | Hauser et al. |
| 5,436,419 A | 7/1995 | Welscher et al. |
| 5,438,831 A | 8/1995 | Okada |
| 5,586,955 A | 12/1996 | Wanie |
| 5,601,512 A | 2/1997 | Scag |
| 5,743,247 A | 4/1998 | Kingsley et al. |
| 5,994,857 A | 11/1999 | Peterson, Jr. et al. |
| 6,026,634 A | 2/2000 | Peter et al. |
| 6,085,502 A | 7/2000 | Wians et al. |
| 6,105,348 A | 8/2000 | Turk et al. |
| 6,109,009 A | 8/2000 | Benson |
| 6,109,010 A | 8/2000 | Heat et al. |
| 6,122,996 A | 9/2000 | Hauser et al. |
| 6,301,885 B1 | 10/2001 | Johnson et al. |
| 6,332,393 B1 | 12/2001 | Trimble |
| 6,339,916 B1 | 1/2002 | Benson |
| 6,378,300 B1 | 4/2002 | Johnson et al. |
| 6,405,513 B1 | 6/2002 | Hancock et al. |
| 6,487,857 B1 | 12/2002 | Poplawski et al. |
| 6,539,713 B1 | 4/2003 | Johnson et al. |
| 6,568,162 B1 | 5/2003 | Walters |
| 6,591,594 B1 | 7/2003 | Hancock et al. |
| 6,609,357 B1 | 8/2003 | Davis et al. |
| 6,625,963 B1 | 9/2003 | Johnson |
| 6,755,703 B1 | 6/2004 | Erickson |
| 2005/0044850 A1* | 3/2005 | Korthals ..................... 60/487 |

* cited by examiner

*Primary Examiner*—Edward K. Look
*Assistant Examiner*—Michael Leslie
(74) *Attorney, Agent, or Firm*—Neal, Gerber & Eisenberg LLP

(57) ABSTRACT

A neutral start switch for preventing vehicle users from starting or activating a vehicle engine under certain circumstances and for use in connection with a control arm mechanism, which may be attached to a casing of a hydraulic pump.

30 Claims, 21 Drawing Sheets

NEUTRAL START SWITCH

BACKGROUND OF THE INVENTION

This invention relates generally to drive devices, and more particularly, to a neutral start switch for use in connection with a drive device. The neutral start switch may be mounted to a drive device, such as a hydraulic pump, transaxle or transmission, for preventing the vehicle user from starting or activating a vehicle engine unless one or more drive devices are in the neutral position. Hydrostatic transmissions come in a variety of configurations, including parallel pump and motor, dual pump and motor, and configurations where the hydrostatic transmission is incorporated within a housing containing gearing, often known as an integrated hydrostatic transaxle or IHT.

It is well known to provide "neutral start switches" for preventing the vehicle user from starting or activating a vehicle engine, unless one or more drive devices are in the neutral position. Such switches are often placed either on the shifting arm or on the linkage leading to the transaxle controls.

SUMMARY OF THE INVENTION

Neutral start switch configurations for preventing vehicle users from starting or activating a vehicle engine under certain circumstances and designed to be part of the control arm or return-to-neutral configuration are disclosed. These configurations may be used with pumps, transmissions or transaxles in a variety of different vehicle applications.

Other benefits and objects of this invention are disclosed herein and will be obvious to readers of ordinary skill in the art. The features disclosed herein can be combined to create a unique design; it should be understood, however, that such features are unique in their own right and can be used independently with other transmission, transaxle or vehicle designs, as will be obvious to one of ordinary skill in the art.

DETAILED DESCRIPTION OF THE DRAWINGS

Figure 1:
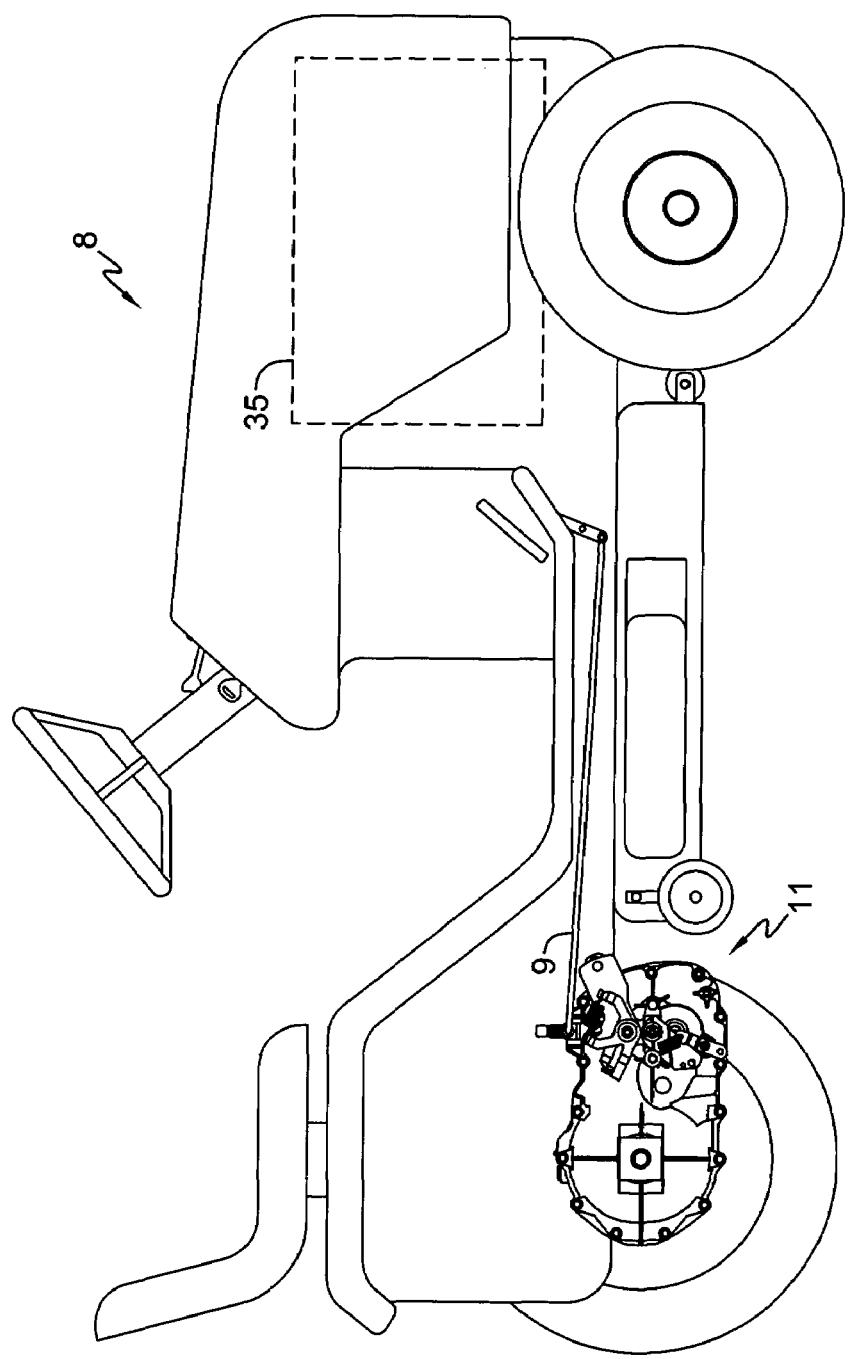
FIG. 1 depicts a side elevational view of a vehicle including a hydrostatic transaxle incorporating the present invention.
Figure 2:
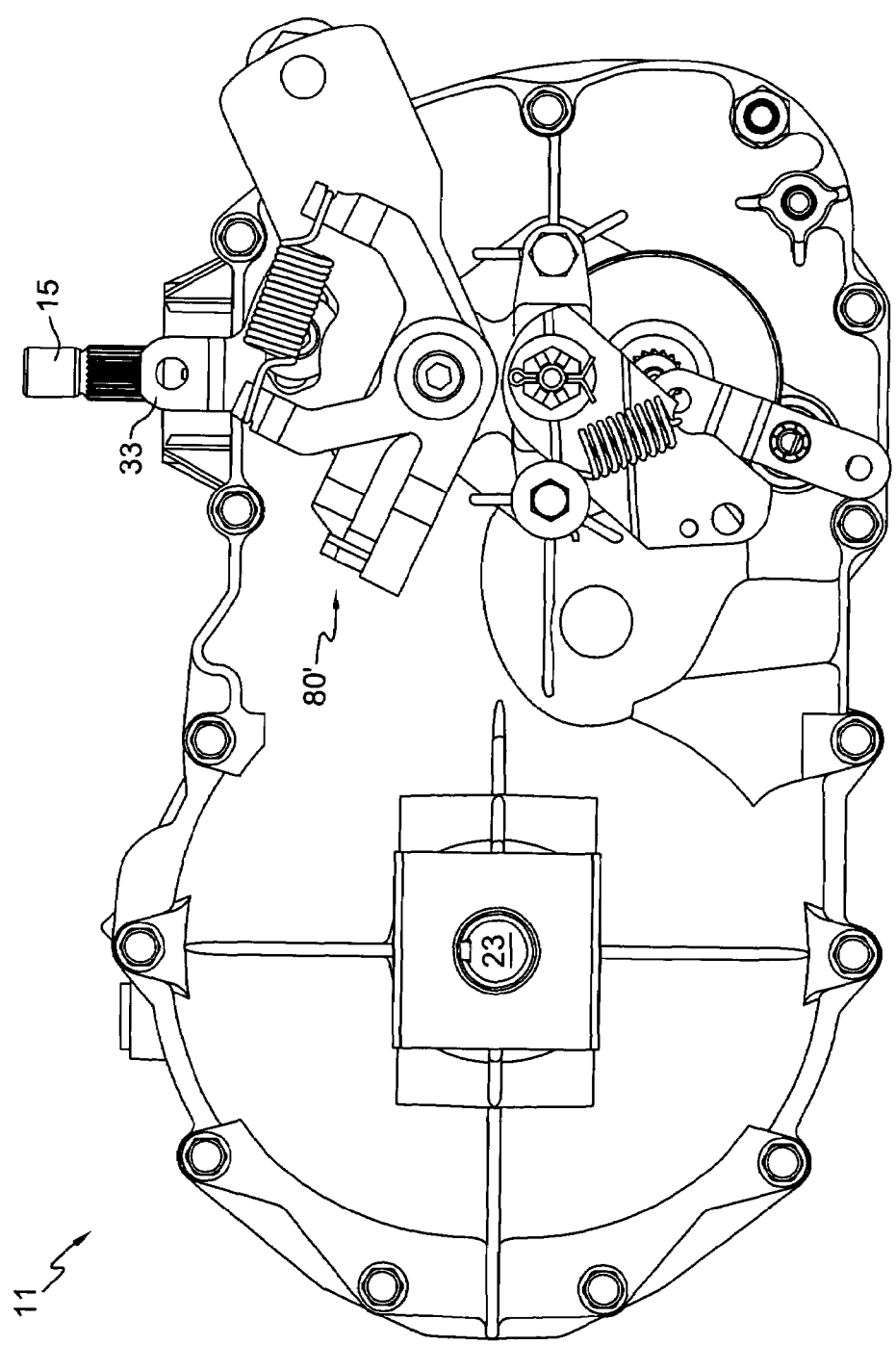
FIG. 2 depicts a side plan view of the hydrostatic transaxle shown in FIG. 1.
Figure 3:
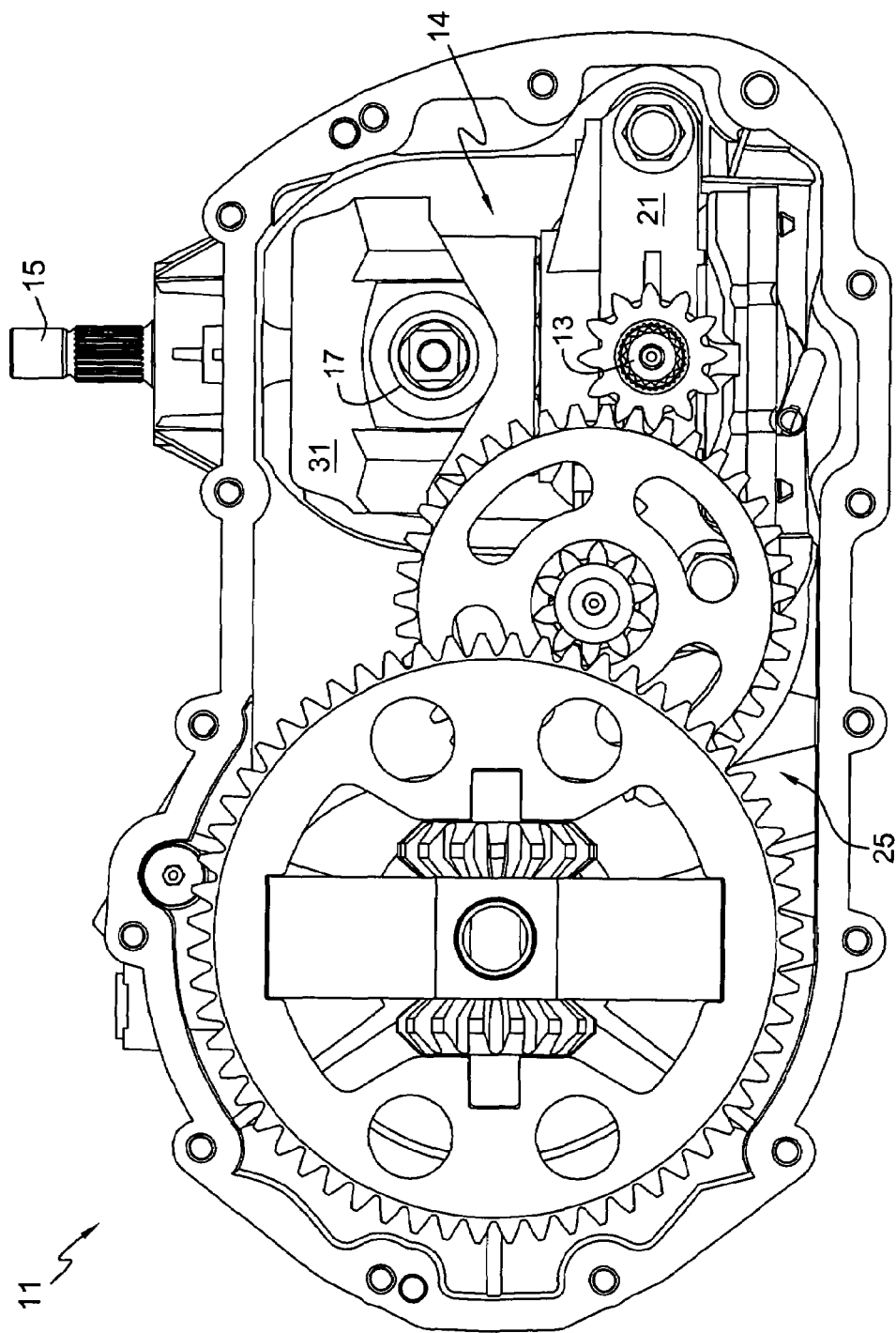
FIG. 3 depicts a side plan view of the hydrostatic transaxle shown in FIG. 2 with the side housing removed.

Turning now to the figures, wherein like reference numerals refer to like elements, there is generally illustrated in FIGS. 1, 2, and 3, a hydrostatic transaxle 11 with a return-to-neutral mechanism 80'. FIG. 1 shows a typical vehicle 8 in which transaxle 11 may be mounted. Also illustrated in FIGS. 4–25 is hydraulic drive unit 10. The following description will use elements from each of these configurations to describe the general function of these devices and the various embodiments of the invention. Note that the figure item number for similar elements between embodiments generally have the same item number with a numerical prefix added. For example, the various neutral switch embodiments are labeled 38, 238, 338, etc.

Transaxles such as that shown in FIGS. 1, 2, and 3 generally operate on the principle of a prime mover 35 driving an input shaft 15. Input shaft 15 then drives a hydraulic pump 14, which then pushes oil through porting formed in center section 21 to a hydraulic motor (not shown) to cause rotation of a motor shaft 13. The rotation of motor shaft 13 may then be transferred through a gearing system 25, or the like, to drive one or more output shafts, which may also be axle shafts 23. For controlling the displacement of pump 14, which will be described in more detail later, a movable swash plate 31 is provided. The position of swash plate 31, which in these figures is of the type known as a trunnion mounted swash plate, is controlled by a trunnion 17 located between swash plate 31 and control arm 33. Additional details regarding the operation of typical transaxles may be found in U.S. Pat. Nos. 5,314,387 and 6,122,996, which are both incorporated by reference herein.

Figures 4, 5:
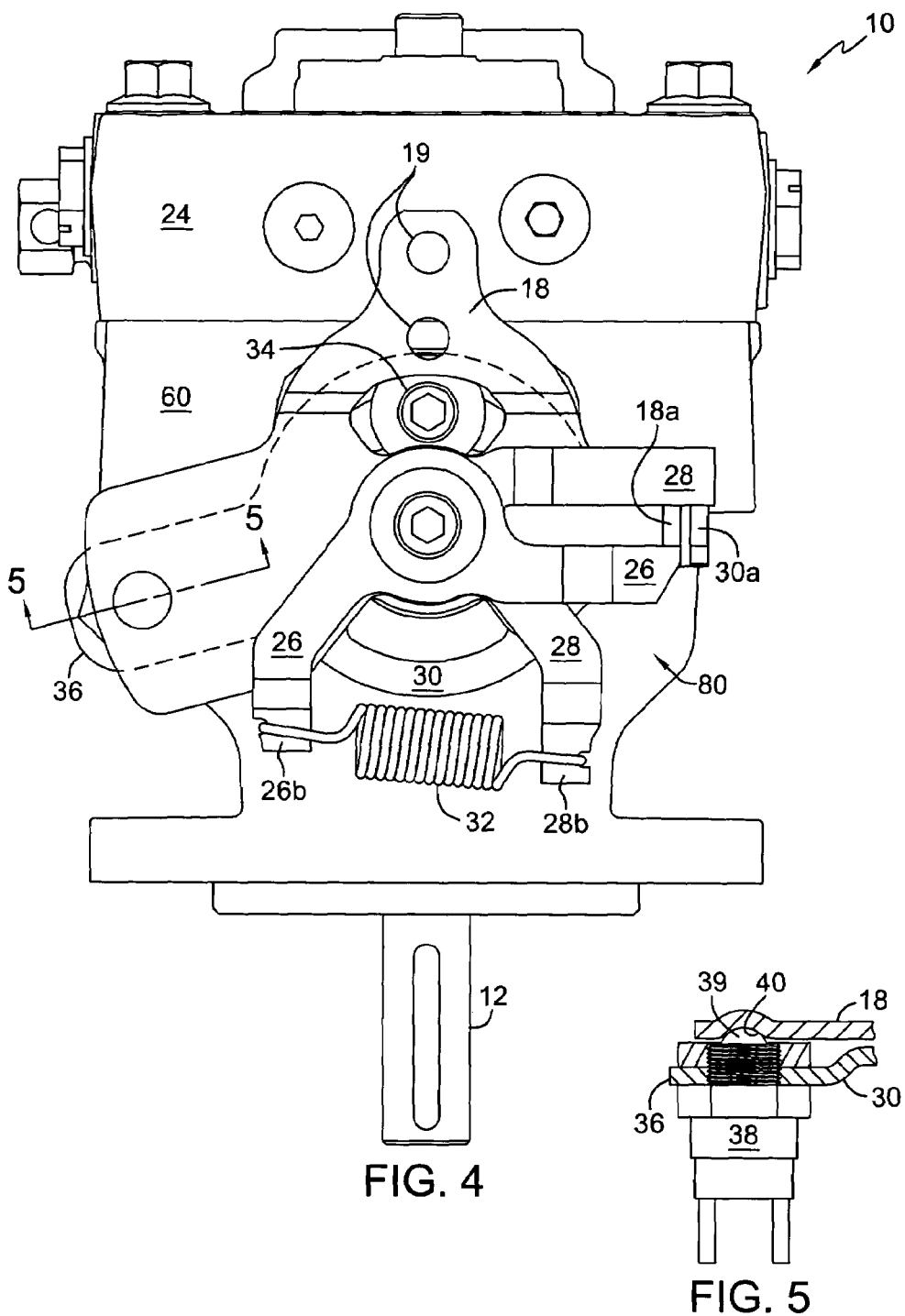
FIG. 4 depicts an elevational view of a first embodiment of a hydraulic pump incorporating the invention in a neutral position.
FIG. 5 depicts a partial sectional view of the embodiment shown in FIG. 4 taken along lines 5—5.
Figure 8:
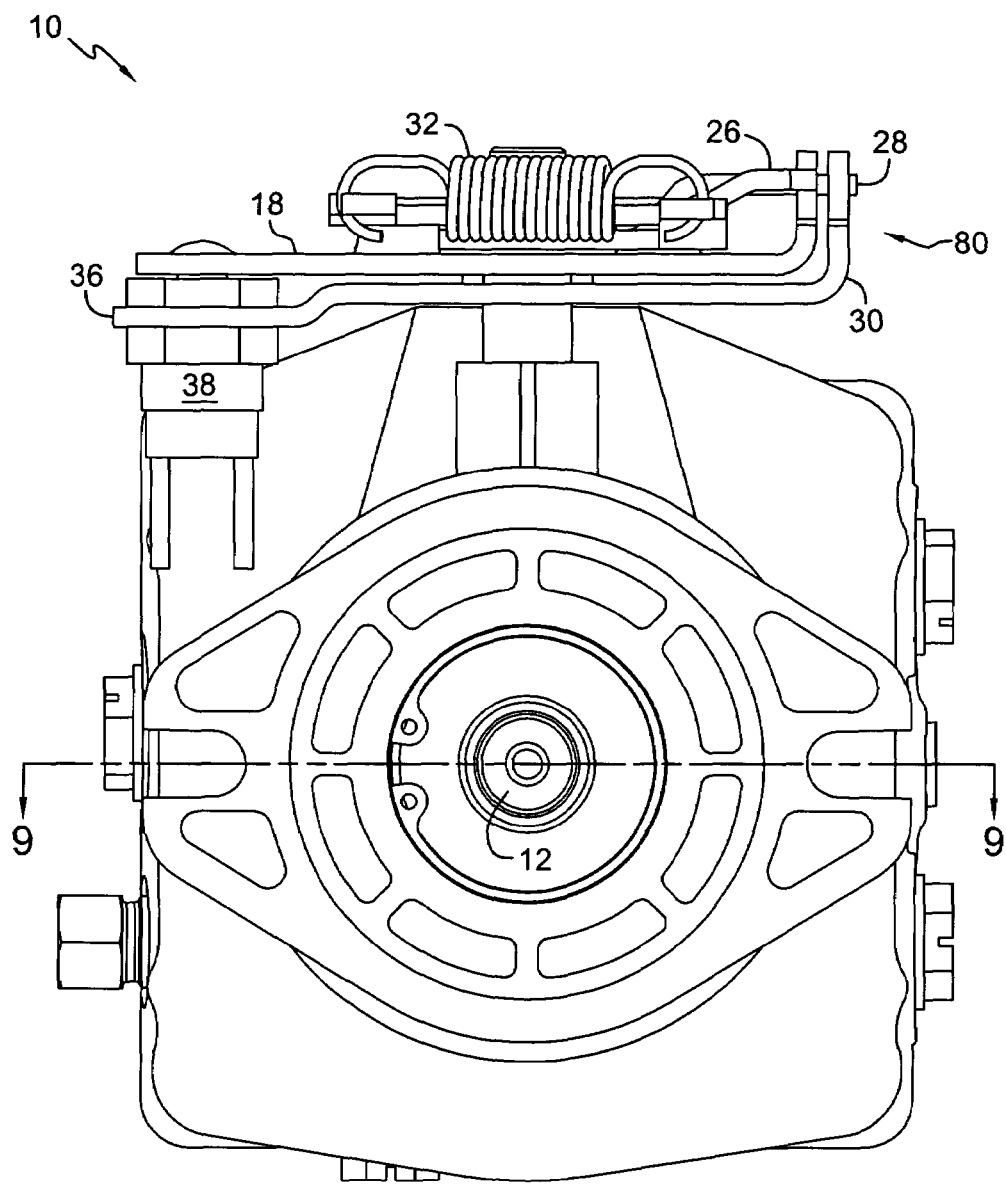
FIG. 8 depicts a bottom plan view of the embodiment shown in FIG. 4.
Figure 9:
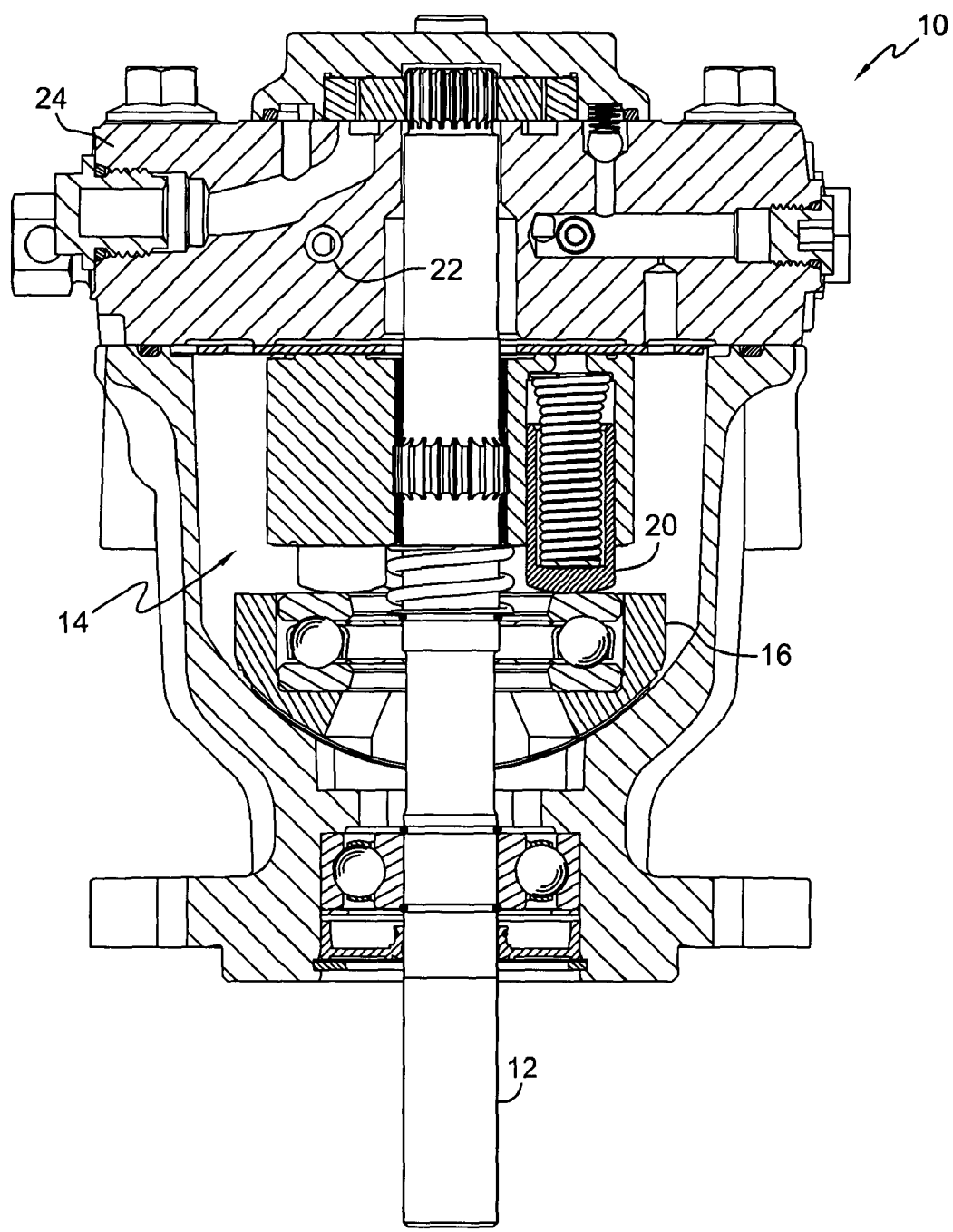
FIG. 9 depicts a cross sectional view of the hydraulic pump shown in FIG. 8 taken along lines 9—9.

To rotate control arm 33 and move swash plate 31, linkage 9 to a vehicle hand or foot control may be provided. To return control arm 33 to neutral under defined operation conditions, a return-to-neutral mechanism 80' may be coupled to control arm 33. Similar to transaxle 11, hydraulic drive units, as defined herein and as shown in FIGS. 4, 8, and 9, also generally operate on the principle of a prime mover 35 driving an input shaft 12. Input shaft 12 then drives a hydraulic pump 14, which through the action of pistons 20 pushes oil through porting 22 to a hydraulic motor to cause rotation of a motor shaft (not shown). Additional details regarding hydraulic drive devices as described herein may be found in U.S. Pat. No. 6,332,393, incorporated by reference herein. For adjusting the amount of oil that is pushed from hydraulic pump 14 to a hydraulic motor, hydraulic drive unit 10 includes a moveable swash plate 16 containing a bearing against which pump pistons 20 travel. As will be understood by those of ordinary skill in the art, swash plate 16 may be moved to a variety of positions to vary the stroke of pump pistons 20 and the direction of rotation of a hydraulic motor. As the stroke of pump pistons 20 is varied, the volume of the hydraulic fluid pumped into porting 22 of end cap 24 will vary. Since the speed of rotation of the hydraulic motor is dependent upon the amount of hydraulic fluid pumped into the hydraulic motor by hydraulic pump 14 and since the direction of rotation of the hydraulic motor is dependent upon the direction of rotation of swash plate 16, the positioning of swash plate 16 is seen to control the speed and direction of rotation of the hydraulic motor and, accordingly, the speed and direction of rotation of the motor output shaft.

For moving swash plate 16, swash plate 16 may be connected to a moveable trunnion arm, functionally similar to trunnion 17 shown in FIG. 3, that is rotatably mounted in casing 60 of hydraulic drive unit 10. As previously noted, the trunnion arm is also connected to a moveable control arm 18. Thus, the rotation of control arm 18 changes the angular orientation of the trunnion arm and swash plate 16 with respect to pump pistons 20.

For use in rotating control arm 18, the return-to-neutral mechanism is comprised of an outer scissor arm 26, an inner scissor arm 28 and a stationary arm 30. For example, FIG. 4 shows a first embodiment of the invention associated with a uni-directional return-to-neutral mechanism 80. The uni-directional return-to-neutral mechanism 80 shown in FIG. 4 is described in more detail in U.S. Pat. No. 6,782,797 ("the '797 patent"), which is commonly owned by the owner of this invention and incorporated by reference herein. In addition, a simplified return-to-neutral mechanism has been disclosed in U.S. Pat. No. 6,487,857 ("the '857 patent"), which is also commonly owned and incorporated by reference herein. The return-to-neutral disclosed in the '857 patent presents a compact design suitable for high volume assembly and automated adjustment. It should be understood by those with skill in the art that the present invention may be used in connection with a variety of control arm and return-to-neutral mechanisms.

During initial assembly, stationary arm 30 is locked into a position to establish a neutral position for return-to-neutral mechanism 80 and thus for hydraulic pump 14. The neutral position is the position of the trunnion arm where the flow of hydraulic fluid from hydraulic pump 14 to a hydraulic motor is insufficient to cause rotation of an associated output shaft. More generally, while the neutral position would typically be adjusted for a minimal output from hydraulic pump 14, a set point at any point in the range of movement for the swash plate 16 may be selected.

To provide for rotation of the trunnion arm, control arm 18 is non-rotatably mounted to the end of the trunnion arm. The non-rotatable mating of control arm 18 to the trunnion arm is preferably accomplished by providing control arm 18 and the trunnion arm with complimentary mating shapes. In this manner, rotation of control arm 18 will also result in rotation of the trunnion arm. For moving control arm 18 and, accordingly, the trunnion arm and swash plate 16 assembly to control the speed and direction of rotation of an output shaft, control arm 18 may also include openings 19 to which linkages associated with hand, foot, electronic or hydraulic controls may be attached, such as linkage 9 shown in FIG. 1.

During assembly, control arm 18 is mounted with stationary arm 30 positioned between control arm 18 and casing 60 of hydraulic drive unit 10. The inner scissor arm 28 and outer scissor arm 26 are rotatably attached to the trunnion arm adjacent to control arm 18. A biasing means 32, such as a spring, is linked to inner and outer scissor arms 28 and 26, and more particularly, to arms 28b and 26b of inner and outer scissor arms 28 and 26, respectively. Once the components are mounted, control arm 18 is moved until the trunnion arm places swash plate 16 in a neutral position.

When control arm 18 is placed in a neutral position, stationary arm 30 is fixed to casing 60 of hydraulic drive unit 10 by means of fastener 34 to lock stationary arm 30 in position. Under the influence of biasing means 32, projection 18a of control arm 18 and projection 30a of stationary arm 30 will be in alignment. This alignment of projections 18a and 30a establishes the neutral position. In the neutral position, both inner scissor arm 28 and outer scissor arm 26 are in contact with projection 18a of control arm 18, as illustrated in FIG. 4.

Figure 6:
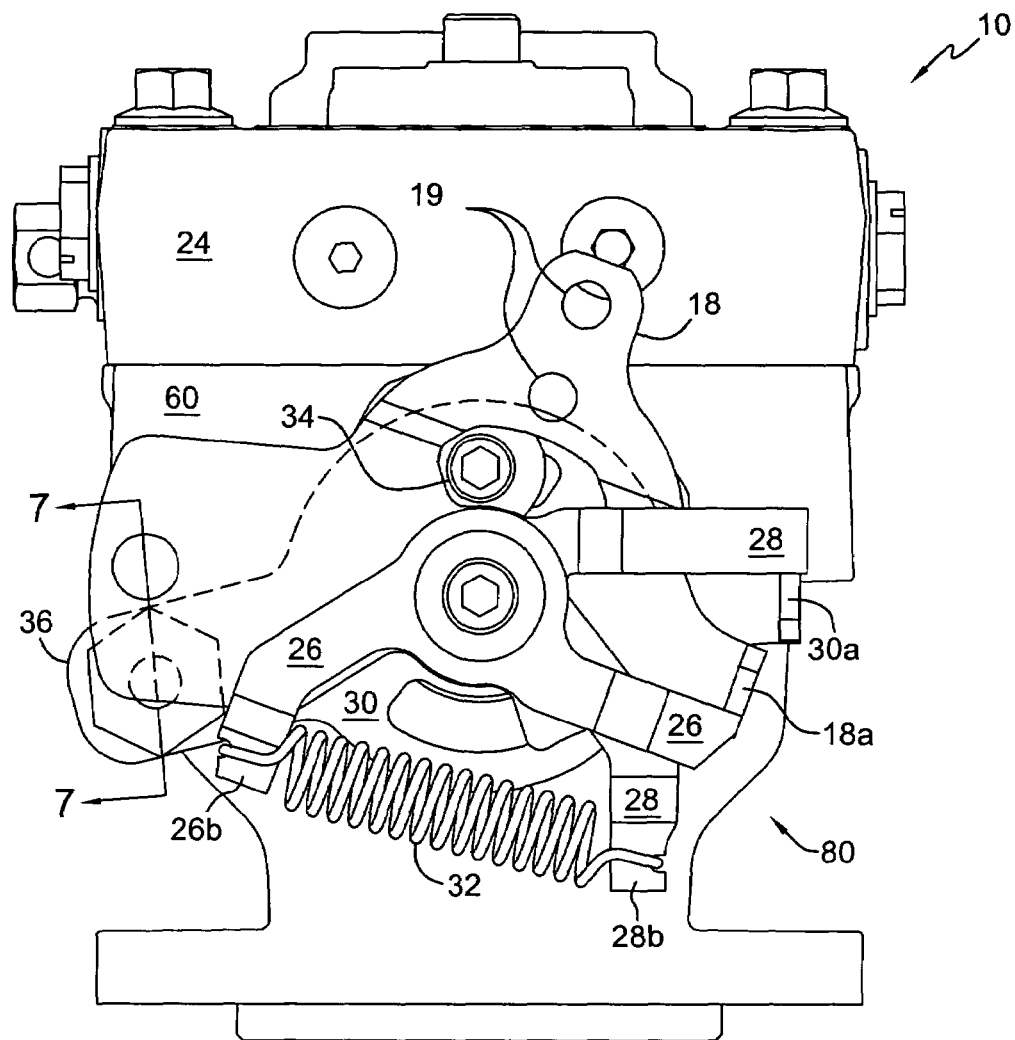
FIG. 6 is an elevational view of the first embodiment with the control arm positioned in stroke.
Figure 7:
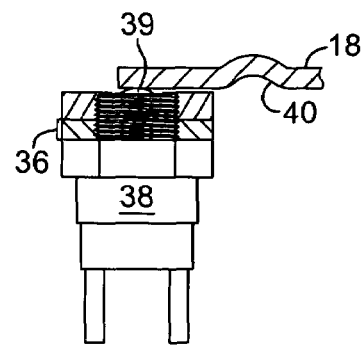
FIG. 7 is a partial sectional view along lines 7—7 in FIG. 6.

When control arm 18 is rotated under the influence of a driving link into a first direction from neutral that may equate to an output shaft reverse direction, projection 18a of control arm 18 will contact outer scissor arm 26. As a result of this contact, movement of control arm 18 will also result in the movement of outer scissor arm 26. Meanwhile, inner scissor arm 28 is prevented from moving as it remains in contact with projection 30a of stationary arm 30, as shown in FIGS. 6 and 7.

Once the influence of the driving link is removed from control arm 18, biasing means 32 will cause outer scissor arm 26 to move toward inner scissor arm 28. During this movement of outer scissor arm 26, outer scissor arm 26 will contact and move control arm 18 towards inner scissor arm 28 and projection 30a of stationary arm 30. The movement of outer scissor arm 26 and control arm 18 by biasing means 32 will continue until projection 18a of control arm 18 aligns with projection 30a of stationary arm 30 and both inner and outer scissor arms 26 and 28 contact projection 18a of control arm 18. Therefore, under the influence of biasing means 32, control arm 18 is returned to the neutral position illustrated in FIG. 4. Therefore, return-to-neutral mechanism 80 functions to substantially establish the neutral position of control arm 18 and to bias and return control arm 18 to the neutral position once the influence of a driving link is removed.

It should be appreciated that there are a variety of configurations available for mounting control arm 18 to the described devices. One common configuration is to mount a control arm on hydraulic drive device 10, and to have all other associated features, such as a return-to-neutral mechanism or forward or reverse stops, mounted on linkage attached to control arm 18. Another configuration is to mount a control arm and a return-to-neutral mechanism directly to hydraulic drive device 10, as shown in FIGS. 4 and 8.

In the configuration shown in FIG. 4, as control arm 18 rotates in a second direction from neutral that is opposite the first direction, which shall be defined as the forward direction for this description, scissor arm 26 and scissor arm 28 will rotate with control arm 18. Thus, in this design, the return-to-neutral mechanism 80 is unidirectional.

For indicating that return-to-neutral mechanism 80 is in a neutral position, switch 38 may be attached to a portion 36 of stationary arm 30. FIG. 5 shows the interface of switch 38 with control arm 18. Switch 38 is in the closed position when contact 39 is in depressed portion 40 of control arm 18. This closed position indicates that return-to-neutral mechanism 80 is in the neutral position. The depressed area 40 may be sized to accommodate expected variations in tolerance. As shown in FIG. 7, when switch 38 has been moved from contact with depressed portion 40 of control arm 18, switch 38 becomes electrically open. Therefore, the open position of switch 38 indicates that the return-to-neutral mechanism is not in a neutral position.

Figure 10:
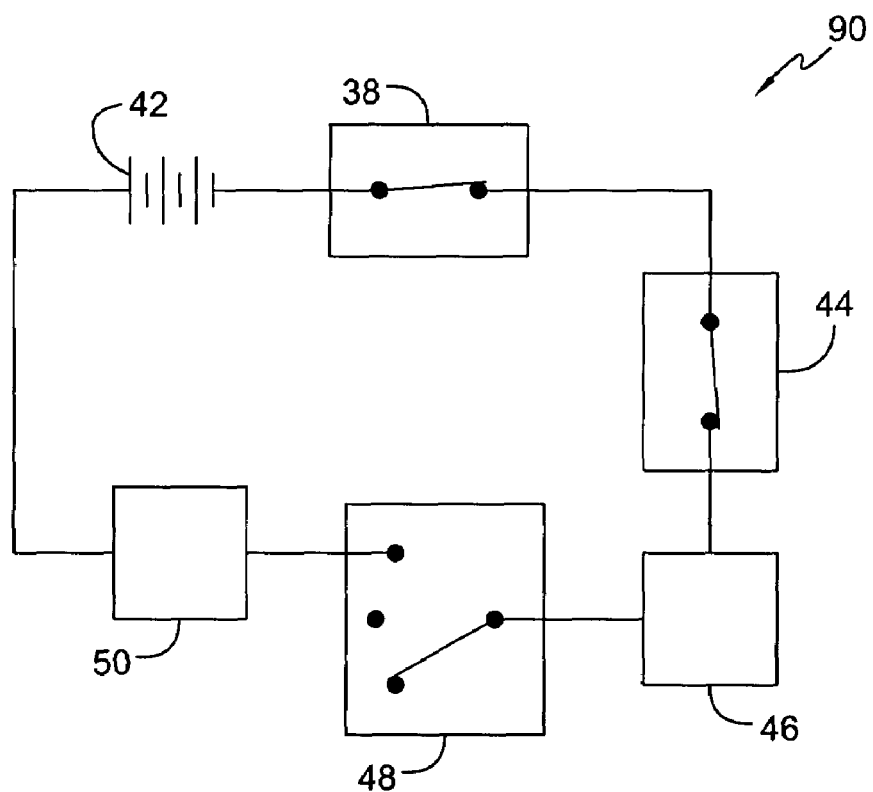
FIG. 10 depicts a simplified schematic of a system utilizing a neutral start switch.

FIG. 10 shows a simplified schematic of a portion of vehicle circuitry 90, which exemplifies the electrical functionality of neutral switch 38. For supplying power to engine start circuit 50, battery 42 is connected to neutral switch 38. When control arm 18 for the drive device is in the neutral position, switch 38 will be in the closed position. If control arm 18 is in the neutral position, the voltage signal is routed through neutral switch 38 and then through ignition switch 48 or a comparable component, thereby allowing the vehicle user to activate the engine. It should also be understood that additional switches may be included as part of vehicle circuitry 90. If neutral switch 38 and any additional switches that may be included in vehicle circuitry 90 are closed, indicating that the conditions monitored by each of the respective switches are in the desired state, then the vehicle user will be able to activate or start the engine or other prime mover.

For requiring the vehicle brake to be activated prior to enabling the engine to be started, the voltage signal may also be routed through a brake switch 44 that is only closed when the brake is activated. To provide other safety functions with respect to starting the vehicle engine, other safety related switches 46 may also be included in vehicle circuitry 90, including, but not limited to, a seat switch to detect operator presence and a blade switch to determine whether the mower blades are in the activated position.

Figure 11:
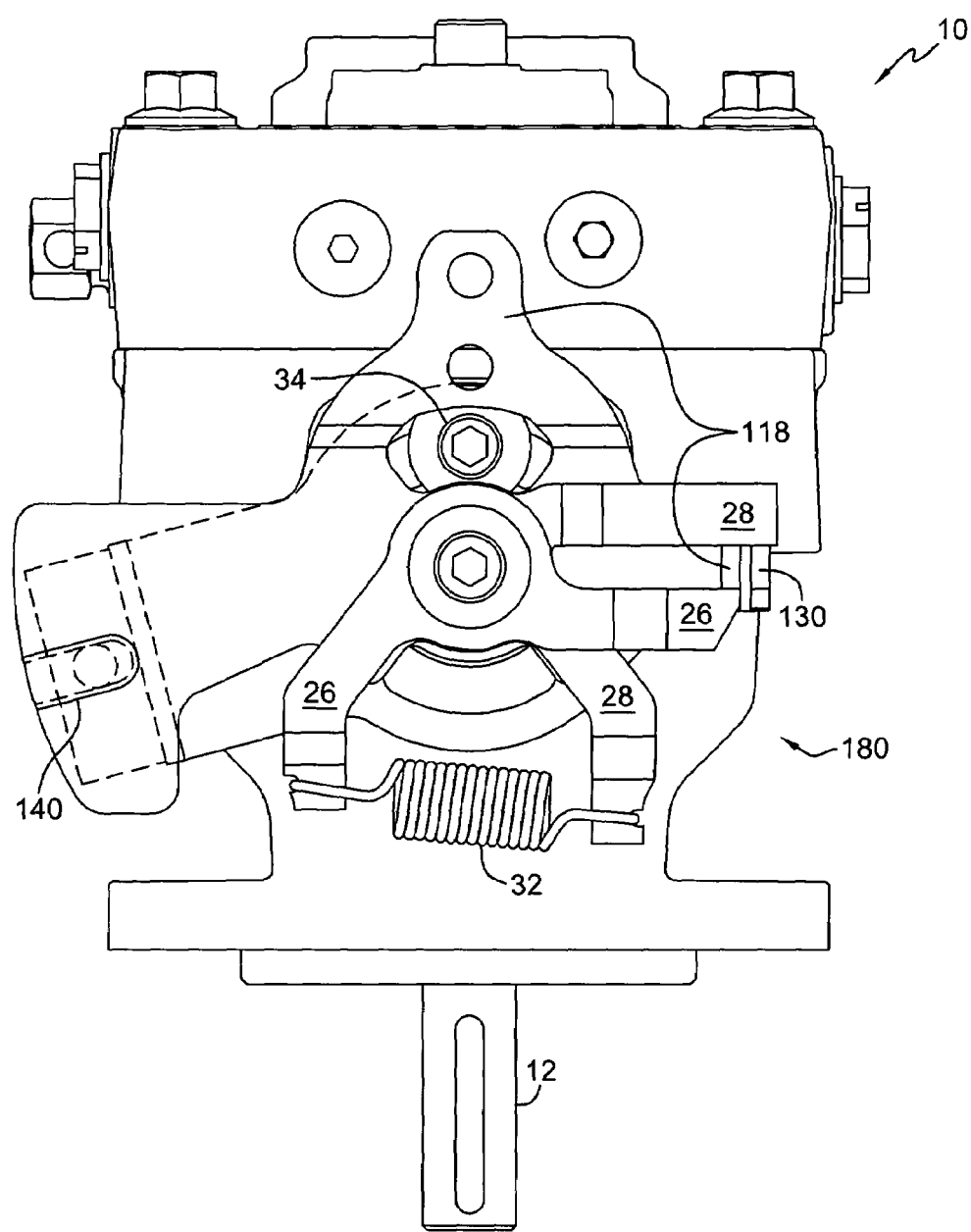
FIG. 11 depicts an elevational view of a second embodiment of the invention.

FIG. 11 shows a second embodiment of the present invention similar in many respects to that shown in FIG. 4. In this configuration, depression 40 has been replaced by a slot or groove 140 in control arm 118. Having a slot or groove 140 eliminates tolerance considerations in the radial direction when interfacing with switch 38. Similar to the first embodiment of the present invention, when contact 39 of switch 38 reaches slot or groove 140, switch 38 becomes closed, which indicates that return-to-neutral mechanism 180 is in the neutral position.

Figures 12, 13:
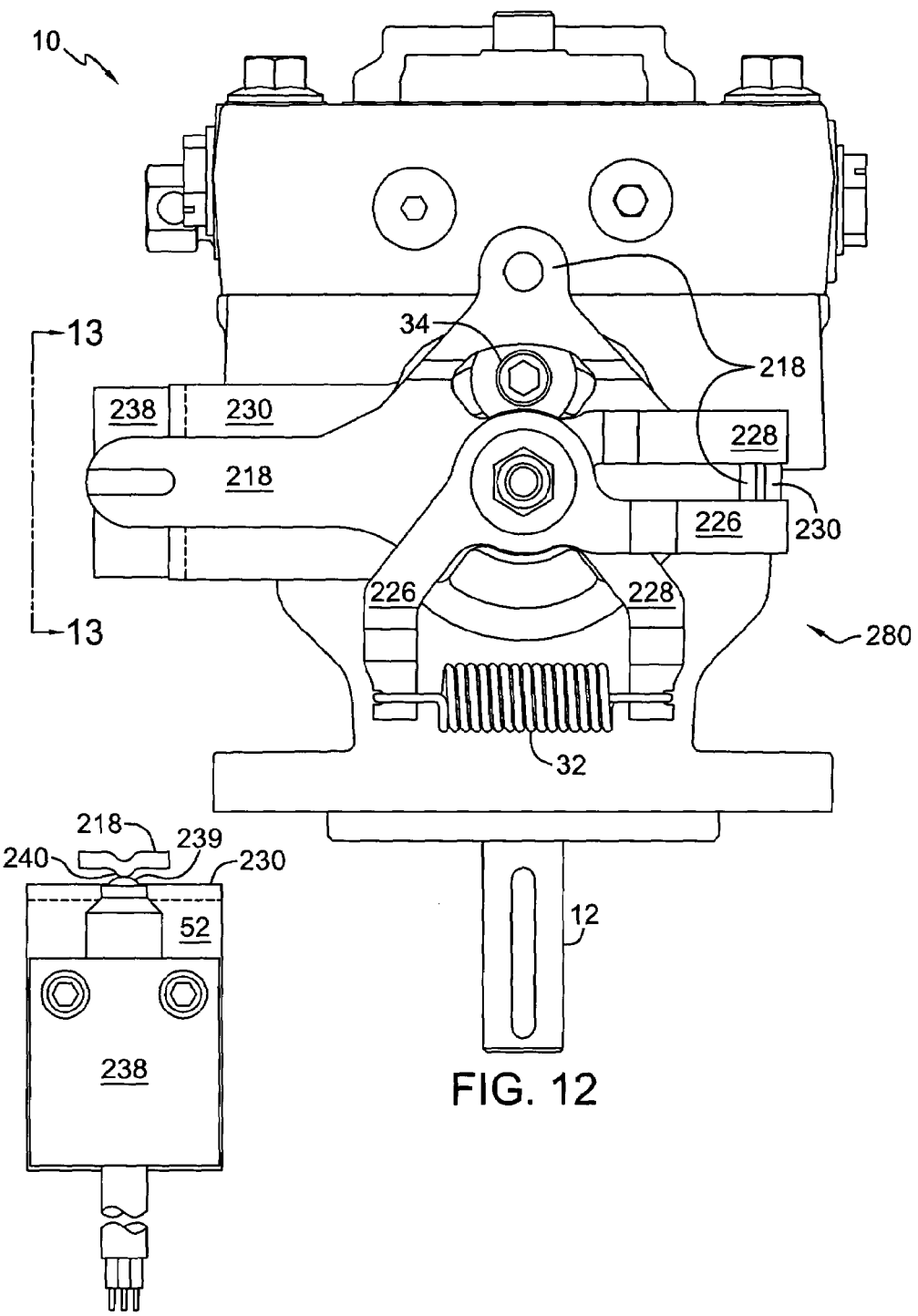
FIG. 12 depicts an elevational view of a third embodiment of the invention.
FIG. 13 depicts a view along the lines 13—13 in FIG. 12.
Figure 14:
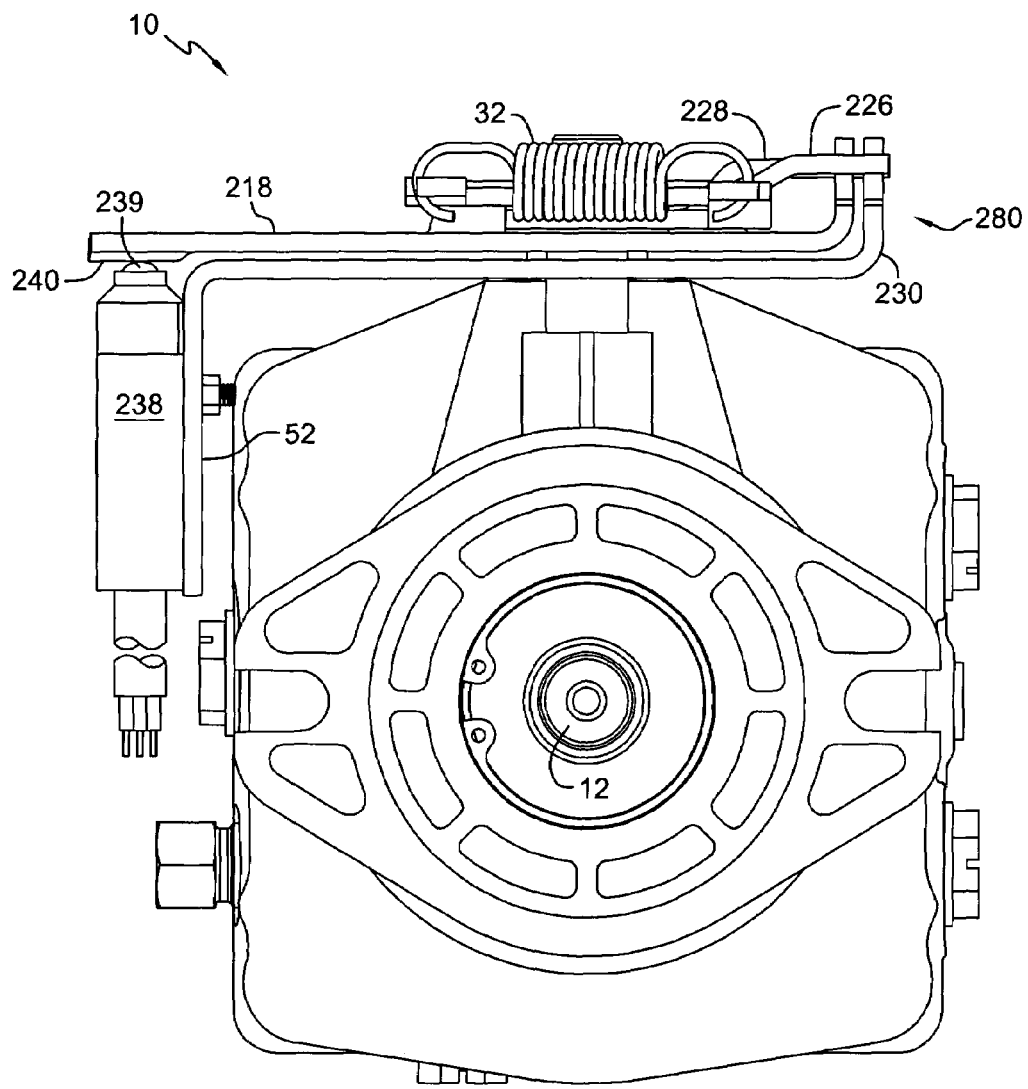
FIG. 14 depicts a bottom plan view of the embodiment shown in FIG. 12.

FIGS. 12, 13, and 14 show a third embodiment of the present invention comprising a raised portion 240 formed on control arm 218. When control arm 218 rotates such that contact 239 interfaces with raised portion 240, switch 238 becomes closed. This alternative also uses a side support 52 for switch 238, which may provide additional support and protection for switch 238. Also shown in this embodiment is a bi-directional return-to-neutral mechanism 280, where scissor arm 226 and scissor arm 228 both contact stationary arm 230, such that regardless of the direction of rotation of control arm 218, upon release of control arm 218 by an operator, spring 32 will act to pull both scissor arms toward stationary arm 230 until both scissor arms 226, 228 are in contact with stationary arm 230.

Figure 15:
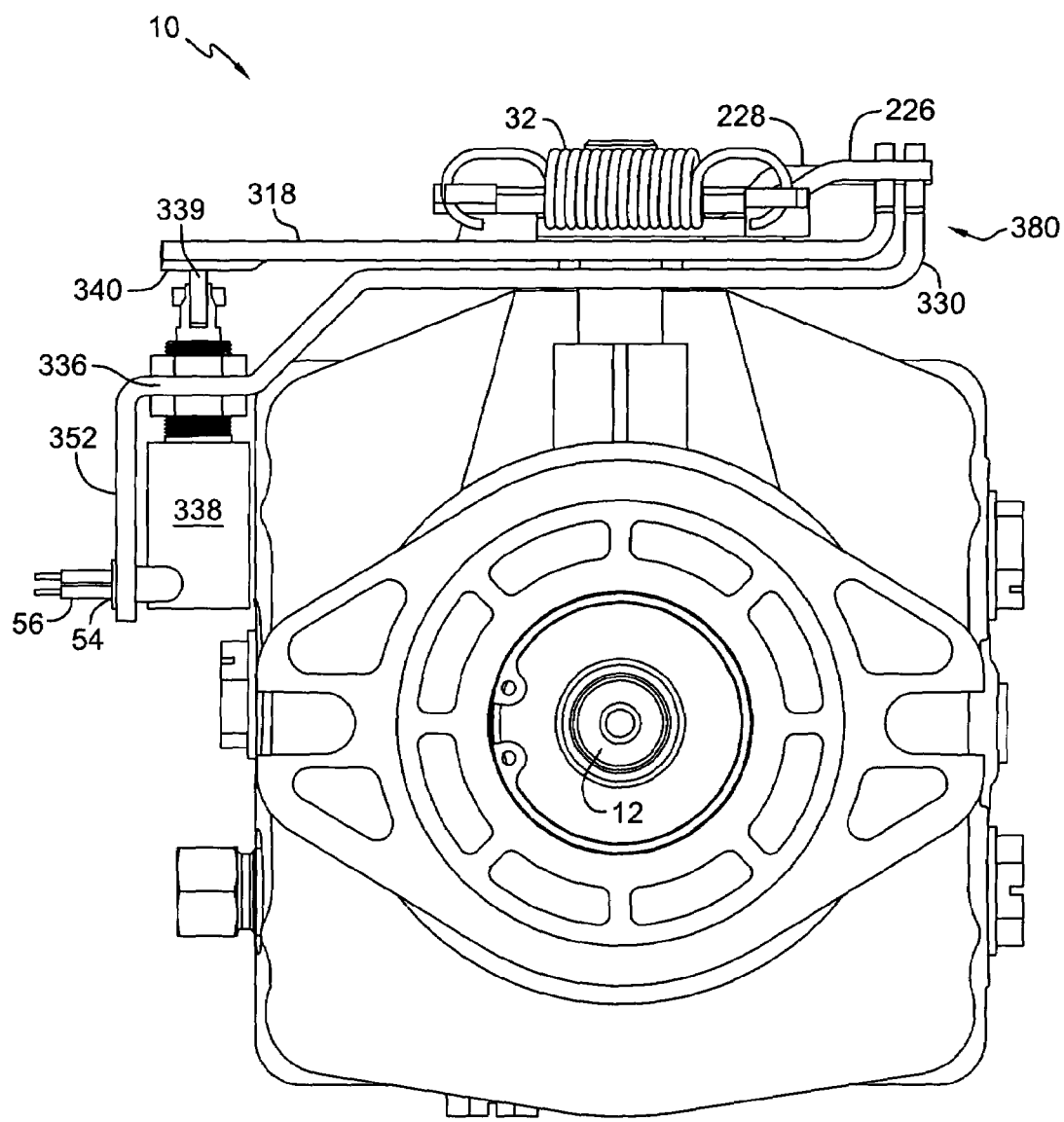
FIG. 15 depicts a bottom plan view of a fourth embodiment of the invention.

FIG. 15 depicts a fourth embodiment of the present invention. Switch 338 is attached to portion 336, as in the first embodiment. Scissor arms 226 and 228 extend past stationary arm 330 to form a bi-directional return-to-neutral. In this configuration, normally open switch 338 has a roller-type contact 339. When contact 339 interfaces with raised portion 340, switch 338 is closed, which indicates that return-to-neutral mechanism 380 is in the neutral position. Side portion 352 of stationary arm 330 provides protection for switch 338, and opening 54 in side portion 352 allows wiring 56 to be supported and strain-relieved.

Figure 16:
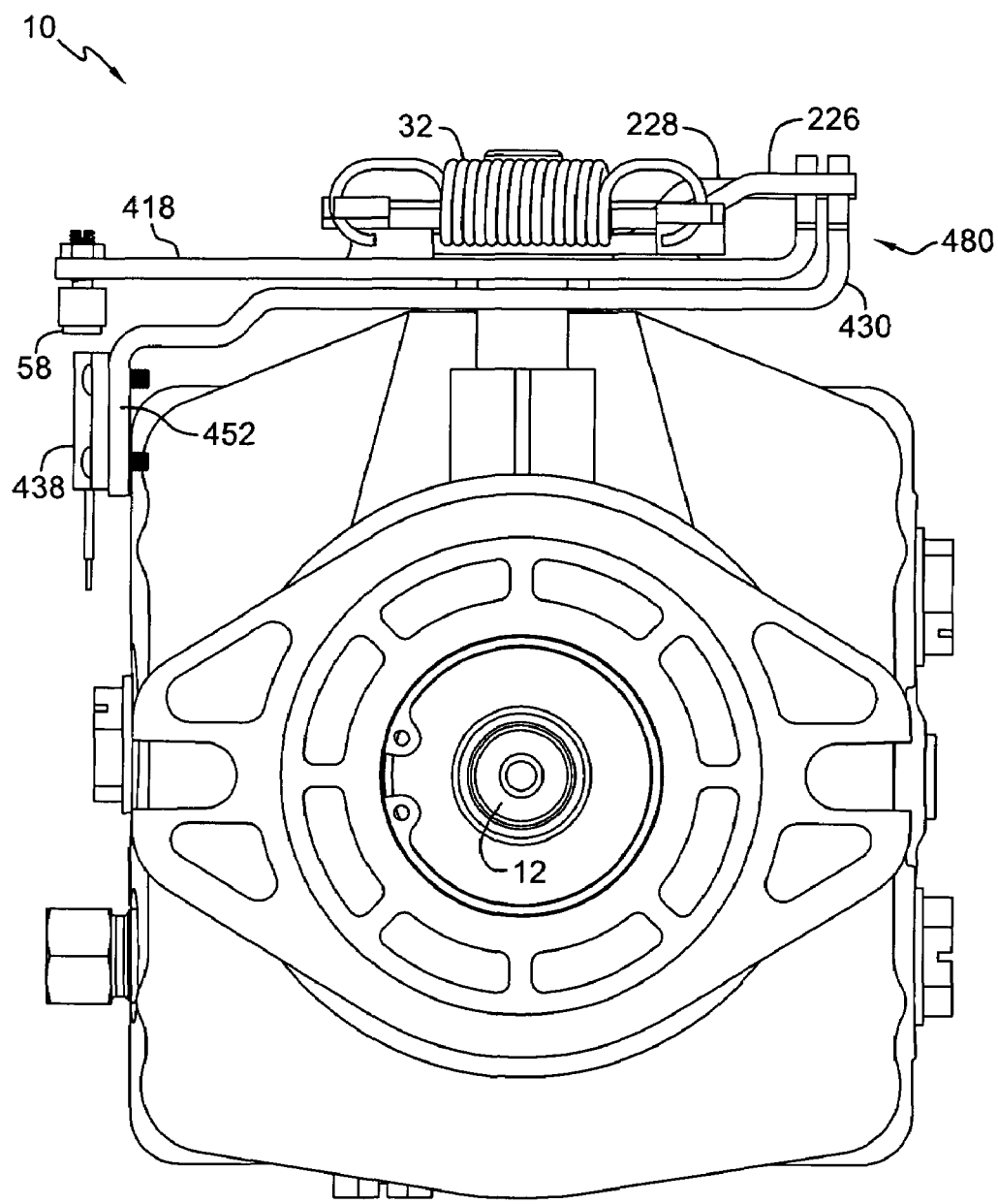
FIG. 16 depicts a bottom plan view of a fifth embodiment of the invention.

FIG. 16 shows a fifth embodiment of the present invention, which is also generally similar to the first embodiment shown in FIG. 4. Switch 438 is a proximity switch, which may be a reed switch, Hall switch, magnetic switch, or the like. Switches of this type are activated by the proximity of a material, such as a magnet 58 mounted on control arm 418, to switch 438. Switch 438 may be mounted on a side support 452 of stationary arm 430. When magnet 58 is within a defined proximity to switch 438, switch 438 becomes closed, which indicates that return-to-neutral mechanism 480 is in the neutral position.

Figure 17:
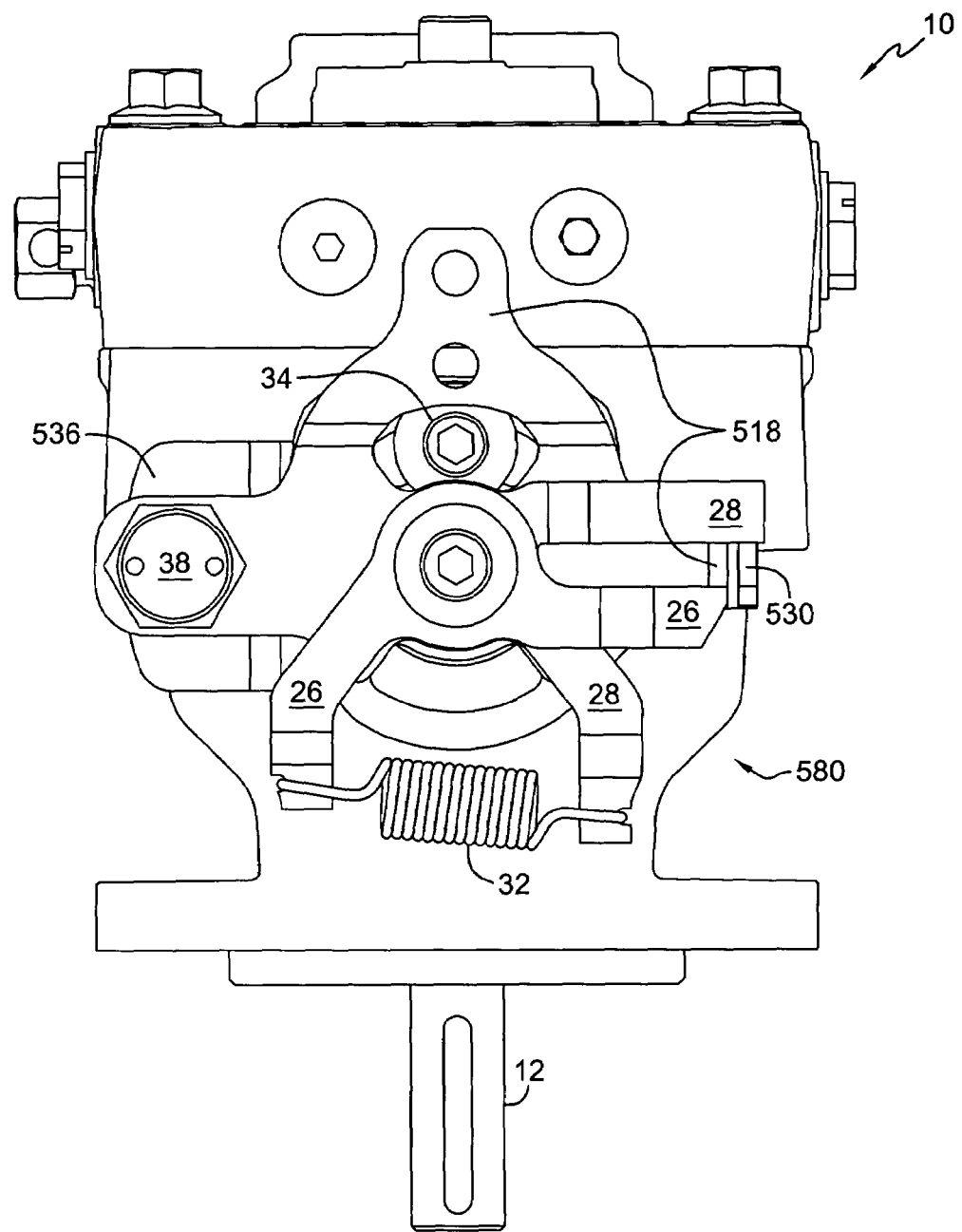
FIG. 17 depicts an elevational view of a sixth embodiment of the invention.
Figure 18:
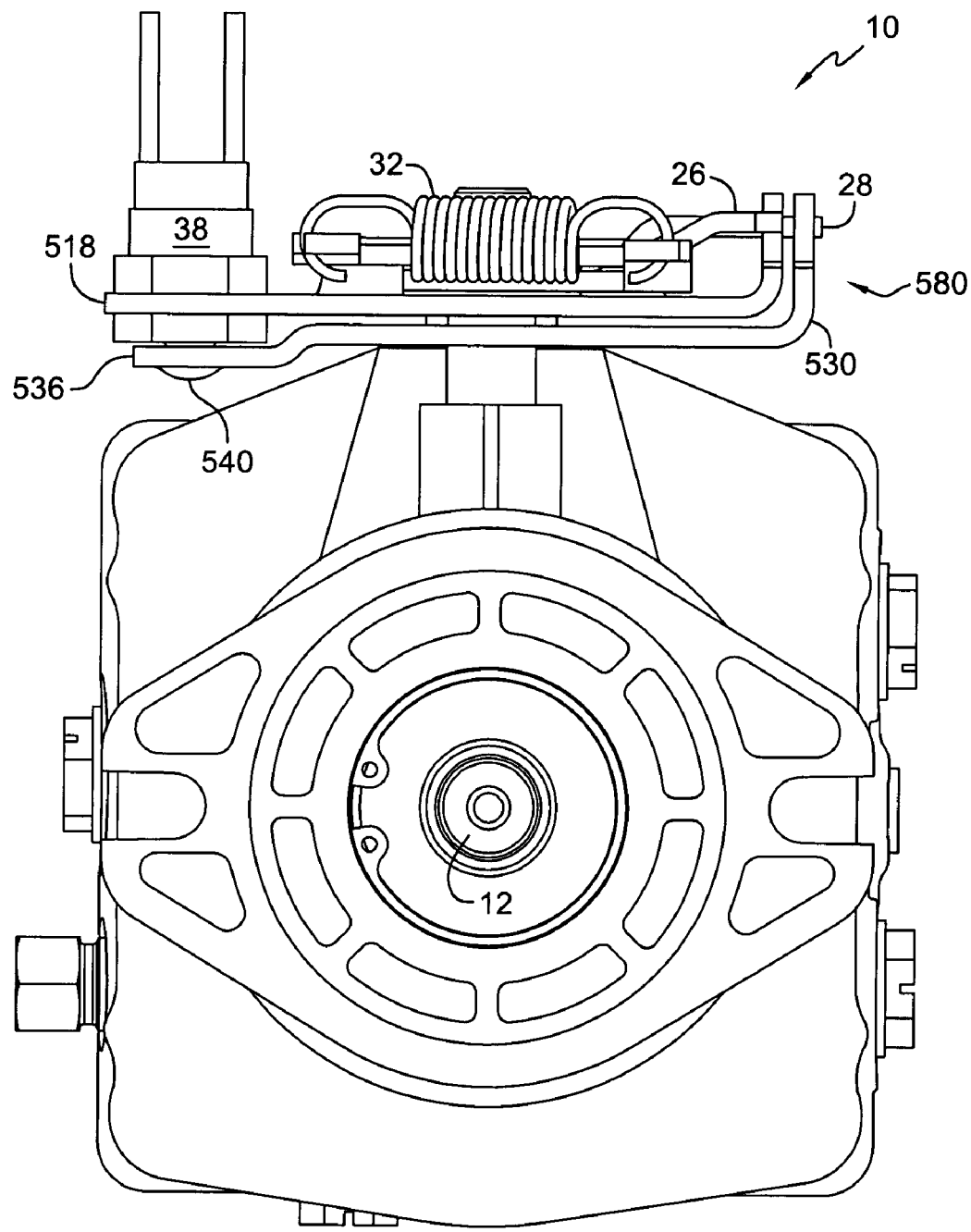
FIG. 18 depicts a bottom plan view of the embodiment shown in FIG. 17.

FIGS. 17 and 18 show a sixth embodiment of the present invention, where neutral switch 38 is attached to and moves with control arm 518 and stationary arm 530 includes a depression, slot or groove 540 located on portion 536 similar to that shown in the first and fourth embodiments described above. Moreover, when contact 39 of switch 38 reaches the depression, slot or groove 540, switch 38 becomes closed, which indicates that return-to-neutral mechanism 580 is in the neutral position. It should also be understood that the depression 540 may be replaced with a raised portion, which may also require switch 38 to be normal open versus normal closed.

Figure 19:
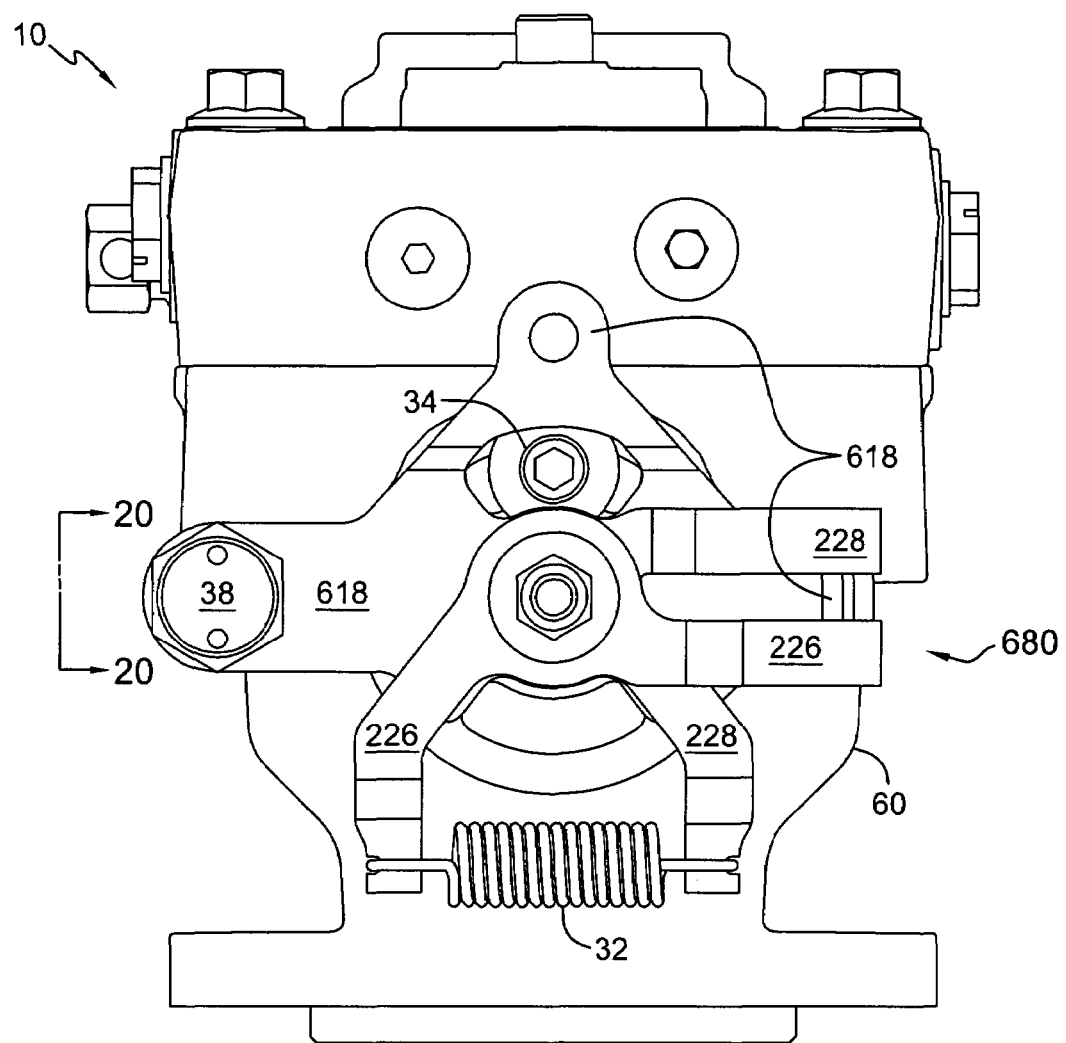
FIG. 19 depicts an elevational view of a seventh embodiment of the invention.
Figure 20:
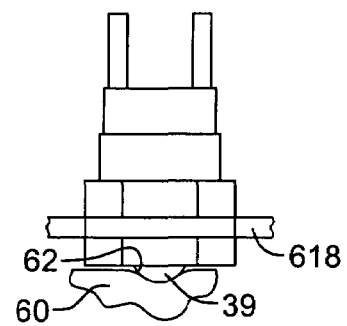
FIG. 20 depicts a partial view of the embodiment shown in FIG. 19 along lines 20—20.

FIGS. 19 and 20 show a seventh embodiment, similar to that shown in FIGS. 17 and 18, where switch 38 is mounted on control arm 618. To actuate switch 38, a feature 62 is formed on housing 60 of pump 10. When control arm 618 rotates and contact 39 interfaces with feature 62, switch 38 becomes closed, which indicates that return-to-neutral mechanism 680 is in the neutral position.

Figure 21:
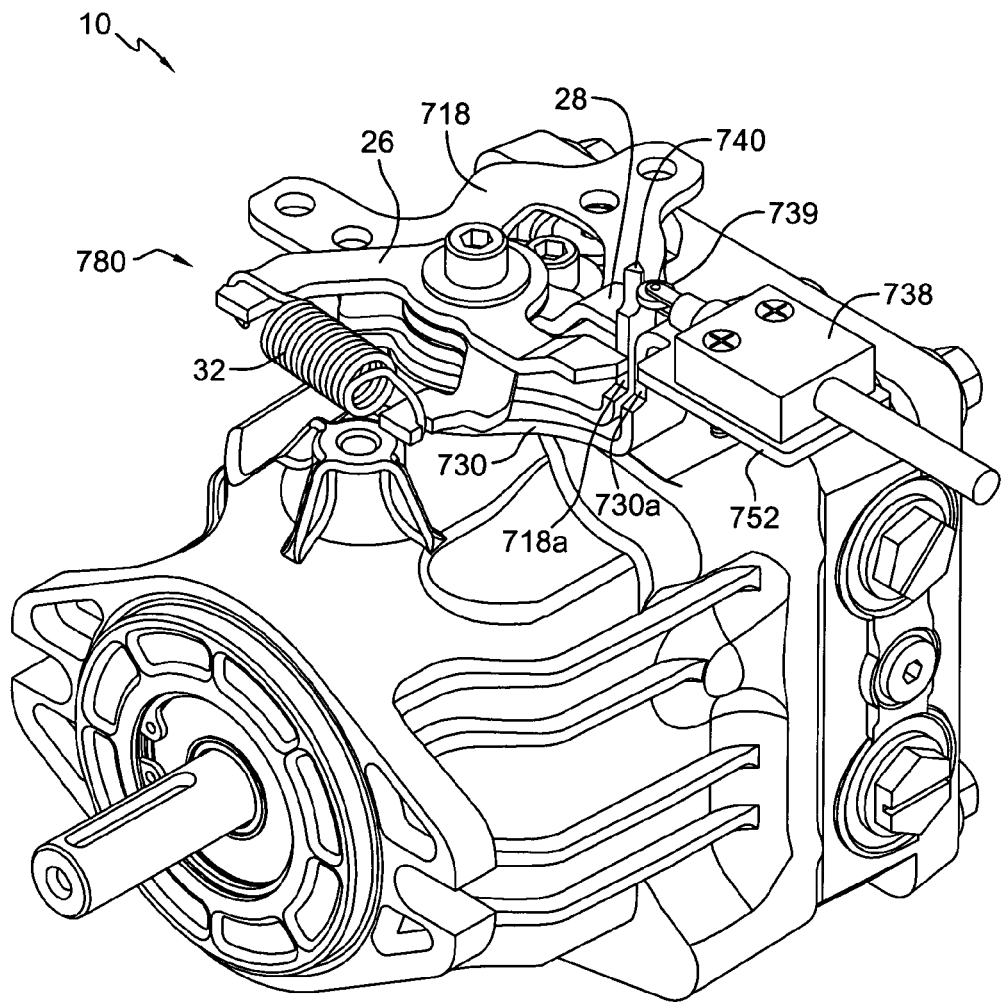
FIG. 21 depicts a perspective view of an eighth embodiment of the invention.

FIG. 21 shows an eighth embodiment, where switch 738 is mounted to a support 752, which is formed as part of stationary arm 730 and positioned proximate to projection 718a and projection 730a on control arm 718 and stationary arm 730, respectively. As control arm 718 rotates, feature 740 will interface with roller 739 of switch 738 and switch 738 becomes closed, which indicates that return-to-neutral mechanism 780 is in a neutral position.

Figure 22:
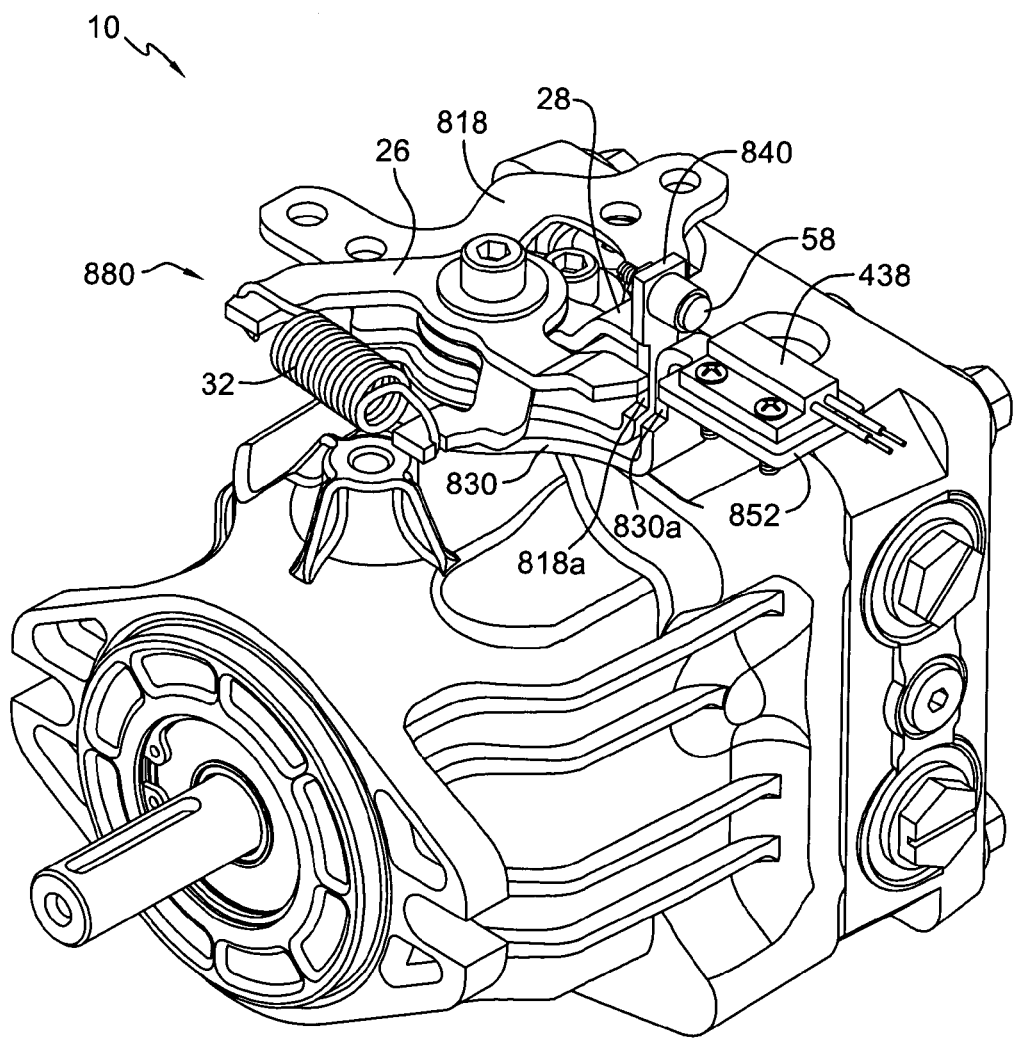
FIG. 22 depicts a perspective view of a ninth embodiment of the invention.

FIG. 22 shows a ninth embodiment, where switch 438 is a proximity switch mounted on side support 852 of stationary arm 830. Again, the proximity switch may be a reed switch, Hall switch, magnetic switch, or the like. The magnet 58 or similar device is mounted on support 840 of control arm 818. As in the third embodiment shown in FIG. 21, switch 438 and its actuating feature, in this case magnet 58, are positioned proximate to projection 818a and projection 830a. As control arm 818 rotates, magnet 58 will interface with switch 438. More specifically, when magnet 58 is within a defined proximity to switch 438, switch 438 becomes closed, which indicates that return-to-neutral mechanism 880 is in the neutral position.

Figure 23:
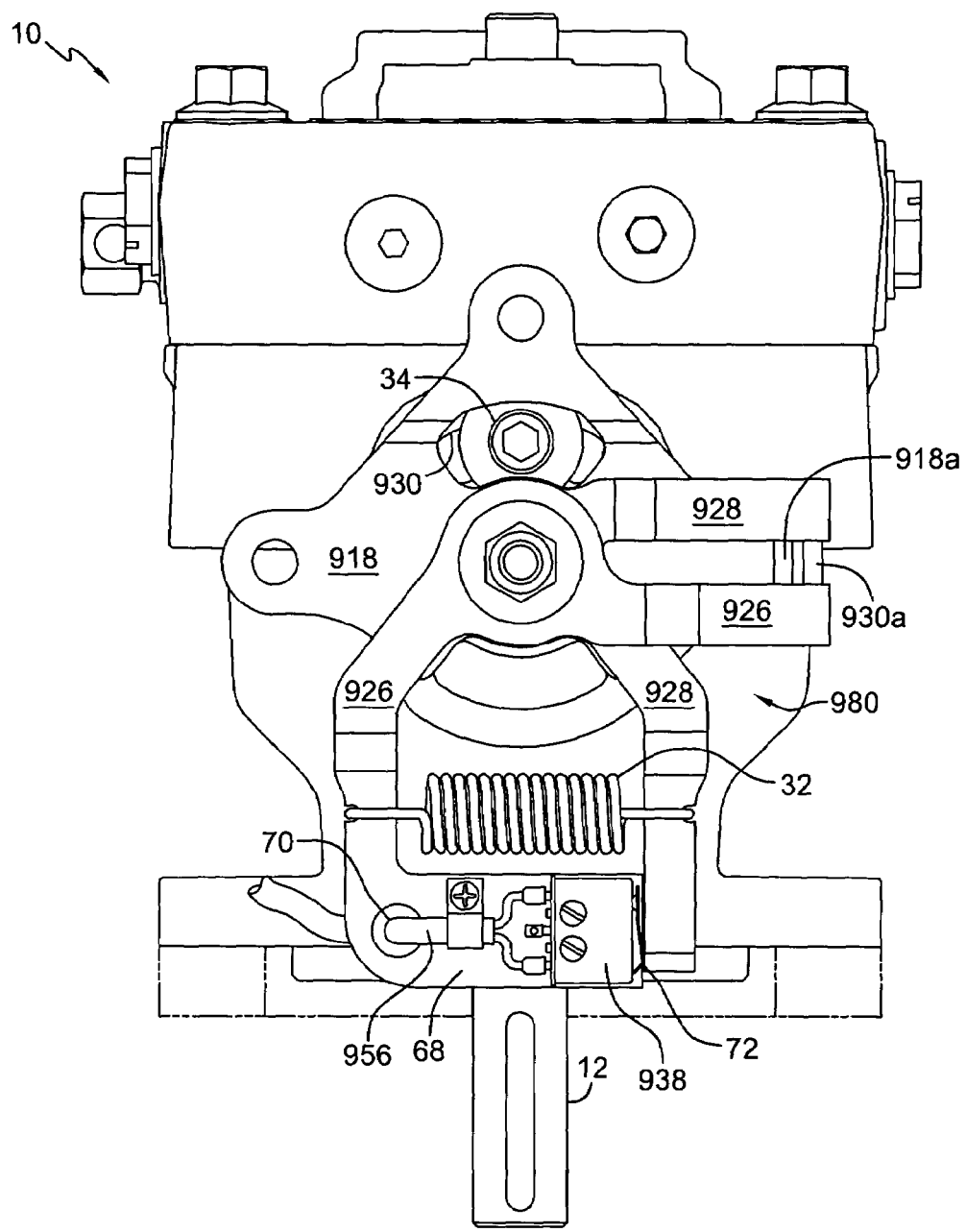
FIG. 23 depicts an elevational view of a tenth embodiment of the invention.

FIG. 23 shows a tenth embodiment, where switch 938 is mounted to support 68, which is formed as part of scissor arm 926. For actuating switch 938 contact 72 is formed as part of scissor arm 928. In this configuration, switch 938 and contact 72 are each located beyond spring 32, which is separate from where scissor arm 926 and scissor arm 928 contact projection 918a and projection 930a. By positioning switch 938 and contact 72 in the manner shown in FIG. 23, the radial space required for the return-to-neutral and neutral switch is repositioned in a location away from various attachment locations and therefore, neutral switch 938 may be configured to accommodate a variety of vehicle and linkage conditions. Opening 70 in support 68 provides support and strain relief for wiring 956.

Figure 24:
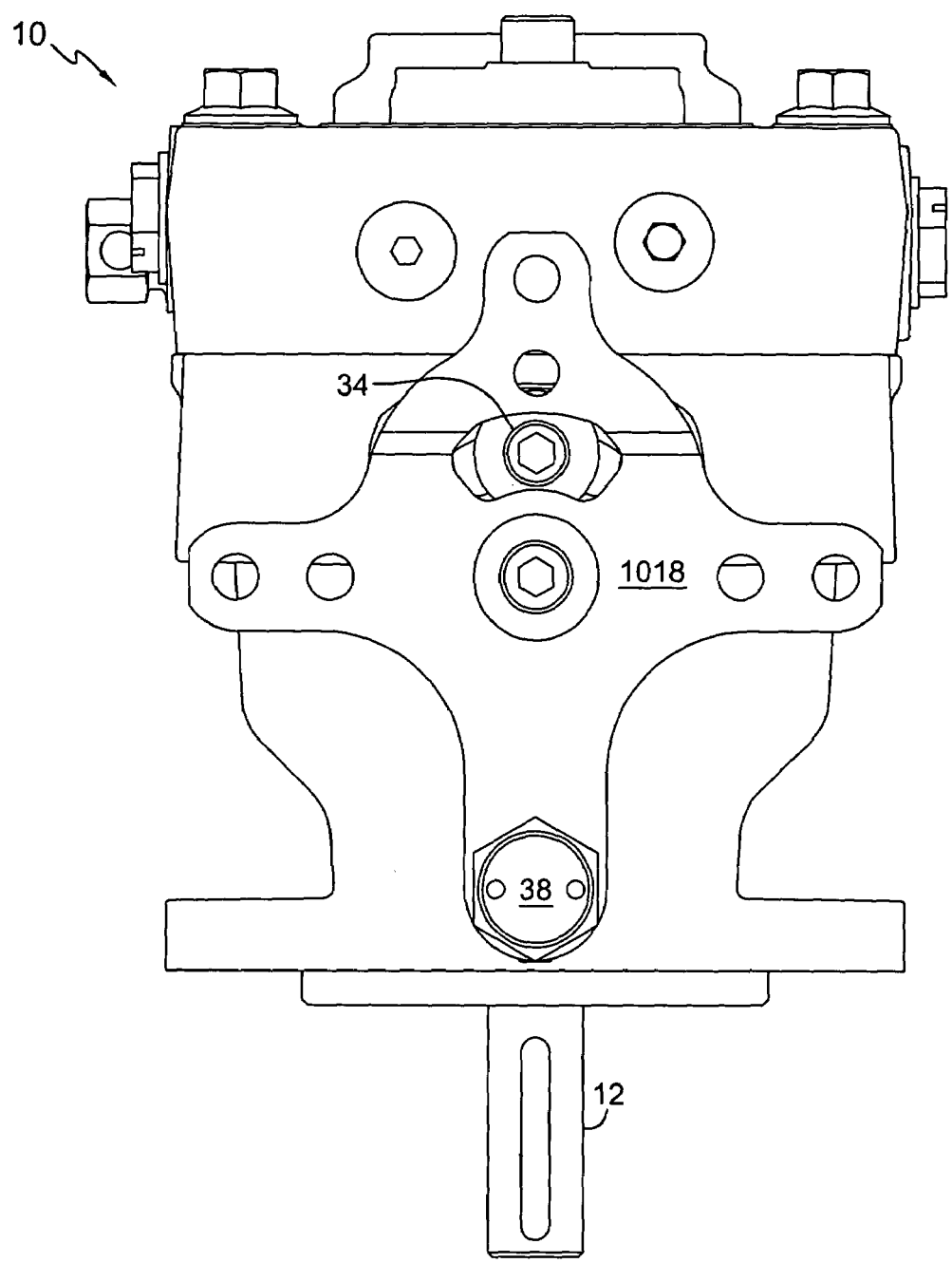
FIG. 24 depicts an elevational view of an eleventh embodiment of the invention.
Figure 25:
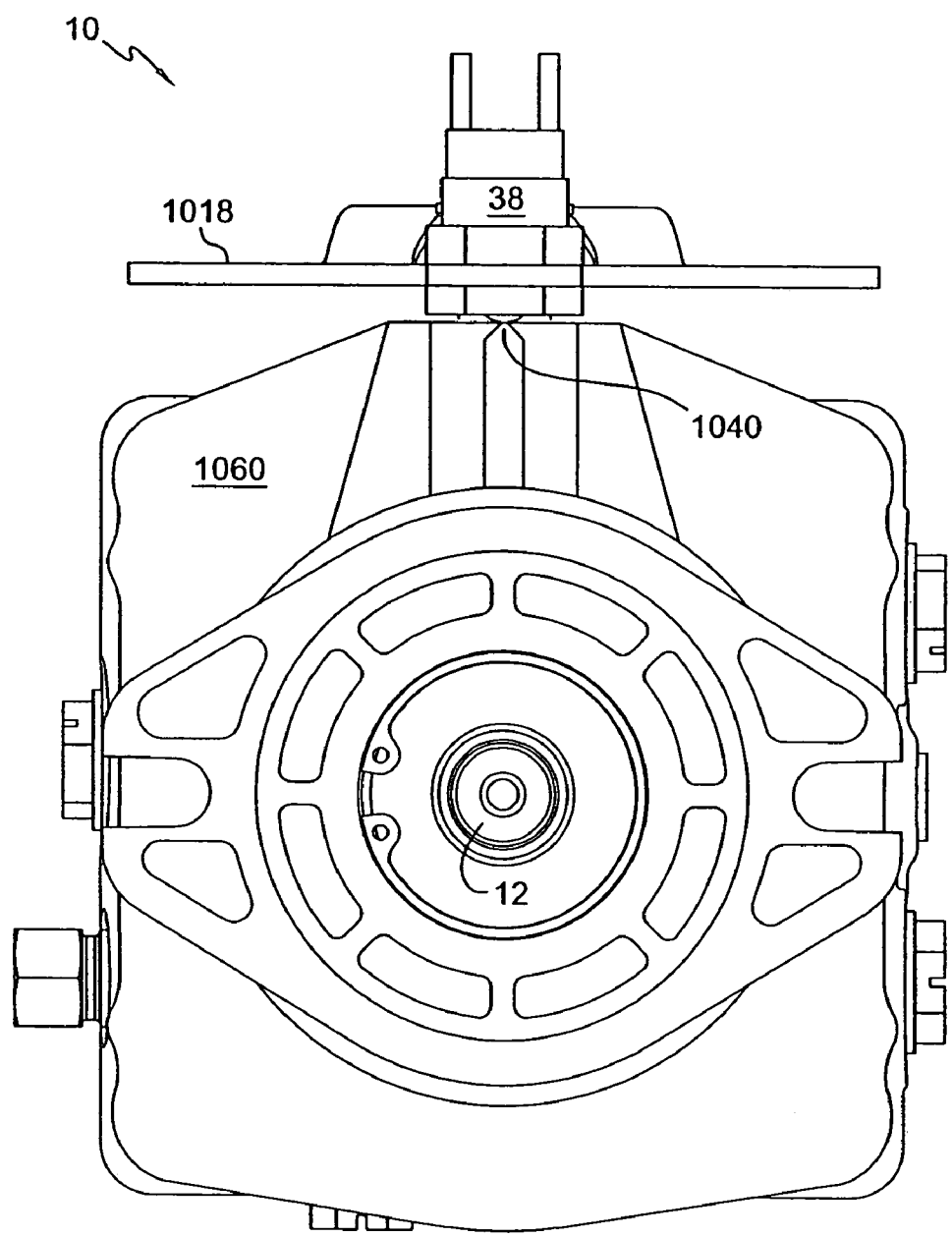
FIG. 25 depicts a bottom plan view of the embodiment shown in FIG. 24.

While all the neutral switch embodiments shown are associated with a return-to-neutral, it is important to note that all of the embodiments, except for the embodiment shown in FIG. 23, could be fully functional without the return-to-neutral components. For example, FIGS. 24 and 25 show one configuration that does not use a return-to-neutral. In such a configuration, if a return-to-neutral is required, it may be located on linkage attached to the control arm. Switch 38 is attached to control arm 1018. For actuating switch 38, contact rib 1040 is formed as part of housing 1060. For example, when control arm 1018 rotates, contact rib 1040 will interface with switch 38 and switch 38 becomes closed, which indicates that control arm 1018 is in the neutral position.

While specific embodiments of the invention have been described in detail, it will be appreciated by those skilled in the art that various modifications and alternatives to those details could be developed in light of the overall teachings of the disclosure. For example, while the discussion herein provides specific nomenclature for the switches described, i.e., normal open or normal closed, a person of ordinary skill in the art would recognize that circuit 90 is but one of numerous configurations possible to accomplish the functions described. Thus, the descriptions "normal open" or "normal closed" should be held as being illustrative only and not limiting. Accordingly, the particular arrangement disclosed is meant to be illustrative only and not limiting as to the scope of the invention which is to be given the full breadth of the appended claims and any equivalents thereof.

What is claimed is:

1. A hydraulic drive device comprising:
   a casing;
   a hydraulic pump located within the casing;
   a control arm coupled to the hydraulic pump to control the hydraulic pump fluid flow;
   a switch attached to the control arm, the switch having an open state and a closed state,
   wherein the state of the switch is indicative of the control arm assuming a predefined position.

2. The hydraulic drive device of claim 1, wherein the predefined position of the control arm is a neutral position.

3. The hydraulic drive device of claim 2, wherein the switch being in the closed state is indicative of the control arm being in the neutral position.

4. The hydraulic drive device of claim 2, wherein a prime mover is drivingly coupled to the hydraulic drive device.

5. The hydraulic drive device of claim 4, wherein an ignition is electrically coupled to the prime mover and the switch.

6. The hydraulic drive device of claim 5, wherein the control arm being in the neutral position places the switch in the closed state and enables the ignition switch.

7. The hydraulic drive device of claim 5, wherein the control arm being out of the neutral position places the switch in the open state and disables the ignition switch.

8. The hydraulic drive device of claim 5, wherein the hydraulic drive device and the ignition are independently mounted to a vehicle.

9. The hydraulic drive device of claim 1, wherein a feature formed on the casing cooperates with the switch to change the switch between the open and closed states.

10. The hydraulic drive device of claim 1, further comprising a return-to-neutral mechanism coupled to the control arm, the return-to-neutral mechanism also including a stationary arm.

11. The hydraulic drive device of claim 10, wherein the position of the stationary arm establishes a neutral position of the hydraulic drive device.

12. The hydraulic drive device of claim 10, wherein a feature formed on the stationary arm cooperates with the switch to change the switch between the open and closed states.

13. The hydraulic drive device of claim 10, wherein the state of the switch is indicative of the control arm position with respect to the stationary arm.

14. The hydraulic drive device of claim 1, wherein the switch is mechanically actuated.

15. The hydraulic drive device of claim 1, wherein the switch is a proximity switch.

16. A hydraulic drive device comprising:
   a casing;
   a hydraulic pump located within the casing;
   a control arm coupled to the hydraulic pump to control the hydraulic pump fluid flow; and
   a switch having an open state and a closed state and cooperating with the control arm,
   wherein the state of the switch is indicative of the control arm assuming a redefined position,
   wherein the switch is a proximity switch.

17. A hydraulic drive device comprising:
   a variable displacement hydraulic pump;
   a control arm coupled to the hydraulic pump for controlling pump displacement;
   a switch cooperating with the control arm, the switch providing a signal that is indicative of the control arm position, and
   a return-to-neutral mechanism coupled to the control arm, the return-to-neutral mechanism having a stationary arm,
   wherein the switch is attached to the stationary arm.

18. The hydraulic drive device of claim 17, wherein the position of the stationary arm establishes a neutral position of the hydraulic drive device.

19. The hydraulic drive device of claim 17, wherein a feature formed on the control arm cooperates with the switch to change the switch between the open and closed states.

20. A hydraulic drive device attached to a vehicle, the vehicle further including a prime mover, which is drivingly coupled to the hydraulic drive device, the hydraulic drive device comprising:
   a housing;
   a hydraulic pump positioned within the housing;
   a control arm coupled to the hydraulic pump for controlling the hydraulic pump output;
   an ignition switch electrically coupled to the prime mover; and
   a neutral switch attached to the control arm and electrically connected to the ignition switch, the neutral switch having an open position where the ignition switch is disabled and a closed position where the ignition switch is enabled, wherein the neutral switch will assume the closed position when the control arm is in a predefined position.

21. The hydraulic drive device of claim 20, wherein the predefined position is a neutral position.

22. The hydraulic drive device of claim 21, further comprising a return-to-neutral mechanism drivingly coupled to the control arm, the return-to-neutral mechanism being used to rotate the control arm to a neutral position and further comprising a stationary arm, an inner scissor return arm, an outer second scissor return arm, and biasing means for returning the control arm to the neutral position.

23. The hydraulic drive device of claim 22, wherein the neutral position is demarked by the position of the stationary arm.

24. The hydraulic drive device of claim 20, wherein the neutral switch is actuated by a feature formed on the casing.

25. The hydraulic drive device of claim 20, wherein the neutral switch is actuated by a feature formed on the stationary arm.

26. The hydraulic drive device of claim 20, wherein the neutral switch is a mechanically actuated switch.

27. The hydraulic drive device of claim 20, wherein the neutral switch is a proximity switch.

28. A hydraulic drive device attached to a vehicle, the vehicle further including a prime mover, which is drivingly coupled to the hydraulic drive device, the hydraulic drive device comprising:
   a housing;
   a hydraulic pump positioned within the housing;
   a control arm coupled to the hydraulic pump for controlling the hydraulic pump output;
   an ignition switch electrically coupled to the prime mover;
   a neutral switch cooperating with the control arm and electrically connected to the ignition switch, the neutral switch having an open position where the ignition switch is disabled and a closed position where the ignition switch is enabled, wherein the neutral switch will assume the closed position when the control arm is in a neutral position, and
   a return-to-neutral mechanism drivingly coupled to the control arm, the return-to-neutral mechanism being used to rotate the control arm to a neutral position and further comprising a stationary arm, an inner scissor return arm, an outer second scissor return arm, and biasing means for returning the control arm to the neutral position,
   wherein the neutral switch is attached to the stationary arm.

29. The hydraulic drive device of claim 28, wherein the neutral switch is actuated by a feature formed on the control arm.

30. A hydraulic drive device attached to a vehicle, the vehicle further including a prime mover, which is drivingly coupled to the hydraulic drive device, the hydraulic drive device comprising:
   a housing;
   a hydraulic pump positioned within the housing;
   a control arm coupled to the hydraulic pump for controlling the hydraulic pump output;
   an ignition switch electrically coupled to the prime mover; and
   a neutral switch cooperating with the control arm and electrically connected to the ignition switch, the neutral switch having an open position where the ignition switch is disabled and a closed position where the ignition switch is enabled, wherein the neutral switch will assume the closed position when the control arm is in a redefined position,
   wherein the neutral switch is a proximity switch.

* * * * *

UNITED STATES PATENT AND TRADEMARK OFFICE
CERTIFICATE OF CORRECTION

| | | |
|---|---|---|
| PATENT NO. | : 7,032,377 B1 | Page 1 of 1 |
| APPLICATION NO. | : 10/653319 | |
| DATED | : April 25, 2006 | |
| INVENTOR(S) | : Scott W. Keller et al. | |

It is certified that error appears in the above-identified patent and that said Letters Patent is hereby corrected as shown below:

Claim 16, Column 8, Line 27 delete "redefined" and replace with --predefined--.

Signed and Sealed this

Sixteenth Day of March, 2010

David J. Kappos
*Director of the United States Patent and Trademark Office*